July 25, 1961 T. K. FREDRIKSON 2,993,951

MECHANICAL RECORDER

Filed March 24, 1959 3 Sheets-Sheet 1

INVENTOR
TORE K. FREDRIKSON

BY R. C. Terry

ATTORNEY

July 25, 1961 T. K. FREDRIKSON 2,993,951

MECHANICAL RECORDER

Filed March 24, 1959 3 Sheets-Sheet 2

INVENTOR
TORE K. FREDRIKSON

BY R. C. Terry

ATTORNEY

July 25, 1961 T. K. FREDRIKSON 2,993,951
MECHANICAL RECORDER
Filed March 24, 1959 3 Sheets-Sheet 3

INVENTOR
TORE K. FREDRIKSON
BY R. C. Perry
ATTORNEY

United States Patent Office 2,993,951

Patented July 25, 1961

2,993,951

MECHANICAL RECORDER

Tore K. Fredrikson, San Mateo, Calif., assignor to Teletype Corporation, Chicago, Ill., a corporation of Delaware Filed Mar. 24, 1959, Ser. No. 801,585
9 Claims. (Cl. 178—1)

This invention relates to code controlled recorders, and more particularly to recorders utilizing entirely mechanical facilities.

The principal object of the invention is to provide permutation code controlled apparatus wherein all selective operations are controlled by solely mechanical instrumentalities.

Another object of the invention is to provide a communication system comprising an all-mechanical send-receive set utilizing a mechanical signal-transferring instrumentality between the signal generator and the signal receiver.

Unlike the conventional forms of code signal controlled sending and receiving devices known in the art, the present invention contemplates an arrangement wherein the electrical components, such as the transmitting contacts of a keyboard transmitter and tape transmitter, and the selector magnet coils of a page printer and tape perforator are omitted, and a mechanical linkage is substituted for the electrical components therebetween.

A more complete understanding of the present invention may be had from the following description taken in conjunction with the accompanying drawings, wherein.

Figure 1:
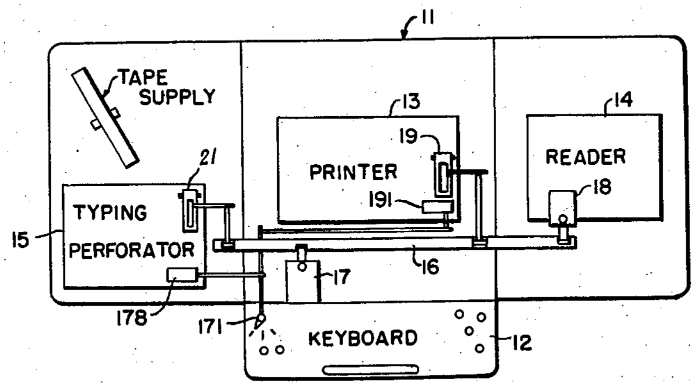
FIG. 1 is a schematic diagram of the all-mechanical tape and page translator set according to the present invention.

Having reference to FIG. 1, the all-mechanical tape and page translator set indicated generally by the numeral 11, comprises a keyboard unit 12 of the type basically as disclosed in United States Patent No. 2,607,848, a page printer unit 13 of the type disclosed in United States Patent No. 2,505,729, a tape reading unit 14, and a tape perforator unit 15 of the type shown in United States Patent No. 2,648,385. A control bar 16 is interconnected between the aforesaid units in a manner to transmit the marking and spacing conditions of the code established in the keyboard unit 12 and/or the tape reader 14 to the printer unit 13 and perforator 15. As will hereinafter appear, the control bar 16 is articulated operably with the transfer bails or rocker members 17 and 18 of the units 12 and 14, respectively, and likewise to the selector mechanisms 19 and 21 of the units 13 and 15 respectively.

Figure 2:
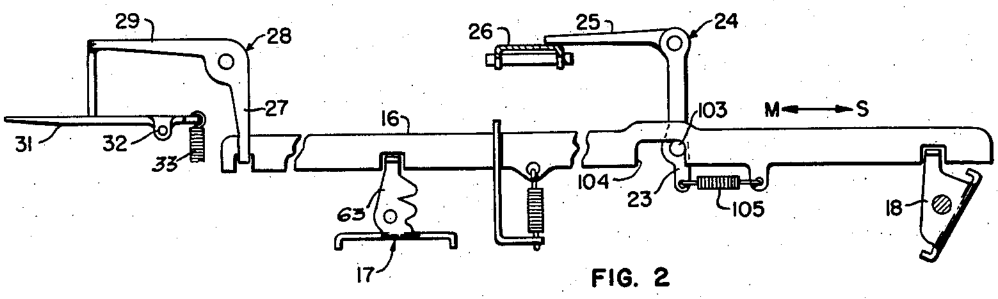
FIG. 2 is an elevational view of the control bar for conveying the selective effect produced by the operation of the key and/or tape controlled transmitter to the receiving units.

As more clearly illustrated in FIG. 2, the control bar

Figure 3:
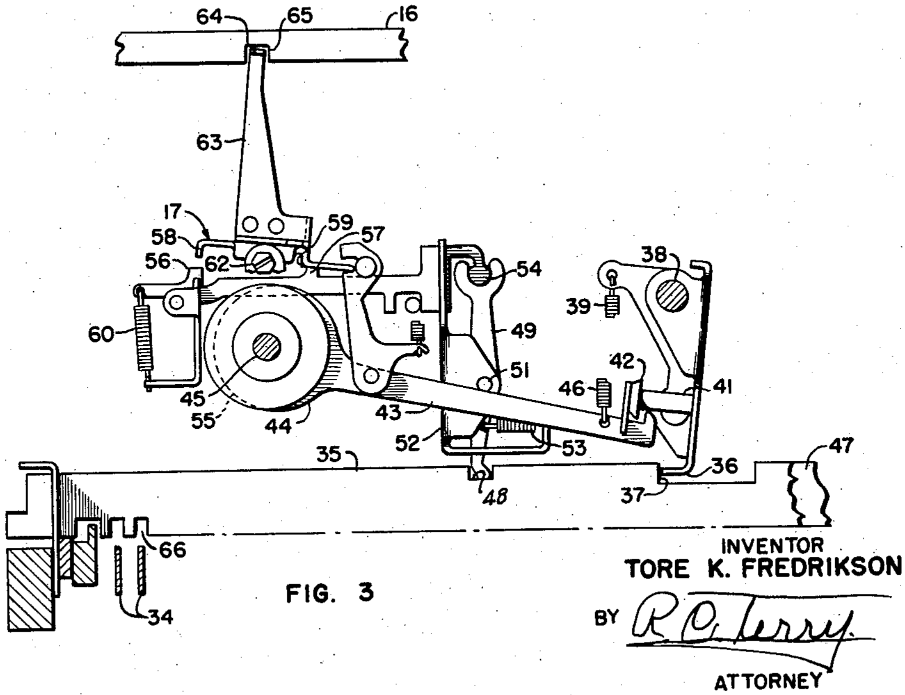
FIG. 3 is a front elevational view, partly in section, of the keyboard transmitter unit, illustrating the interconnection between the rocker member of said unit and the control bar.

16 is shown articulated to the vertical arm 63 of the member 17 of the keyboard unit 12, to be described more in detail in connection with FIG. 3. Similarly, control bar 16 is articulated to the rocker member 18 of the tape reader 14, which relation will presently be described in detail. Also, as described with greater particularity hereinafter, the control bar 16 is also related pivotally with the depending arm 23 of a bell crank lever 24, the horizontal arm 25 of which engages the selecting element 26 which is analogous to the armature of the well known selector magnet (not shown) which has been dispensed with. Control bar 16 is also articulated to the depending arm 27 of a bell crank lever 28 whose arm 29 is conformed to depress a selector element 31 mounted pivotally at 32 and normally biased clockwise (as viewed in FIG. 2) into contactual relation with said arm 29 by a spring 33.

Having reference to the structure shown in FIG. 3 which is basically similar to the structure shown in FIG. 2 of United States Patent No. 2,691,062, the keylevers 34 control the setting of code bars 35 permutably. As set forth in United States Patent No. 2,607,848, issued August 19, 1952, to W. J. Zenner, the code bars 35 are normally biased rightwardly (as viewed in FIG. 3) by individual springs (not shown), but are held in their leftward position by a bail member 36 which bears against shouldered portions 37 on said code bars 35. Bail member 36 is mounted pivotally on a suitably journalled shaft 38, and is normally urged in a counterclockwise direction (as viewed in FIG. 3) by a spring 39. However, bail 36 is normally restrained against said counterclockwise movement by a key controlled trip-off means (not shown) of a nature substantially as disclosed in said patent. Carried on bail 36 is a stud 41 at the extremity of which is fixed a blade 42 which cooperates with a reset arm 43 of the follower plate of a reset cam 44 of the eccentric cam type carried on shaft 45. Arm 43 is normally held in cooperative relation with the blade 42 by a spring 46.

As more fully described in said United States Patent No. 2,607,848, the clutch (not shown) carried on shaft 45 is of the single revolution type, and is normally blocked against rotation by a release lever (not shown) controlled by a universal bar 47 upon the actuation of a keylever 34. Each of the code bars 35 is provided on its upper edge with a notch 48 which cooperates with the lower arm of a transfer lever 49. Levers 49 are mounted pivotally on a pivot rod 51 suitably supported in a bracket 52, and are normally biased counterclockwise by individual springs 53. Levers 49 are normally held in their clockwise position against the action of springs 53 (as shown in FIG. 3) by the notch 48 of code bars 35, and when the code bars 35 are permitted to move rightwardly the associated levers 49 are permitted to rotate counterclockwise a predetermined amount under the action of their individual springs 53. Levers 49 are guided by the upper and lower flanges of bracket 52.

Pivotally articulated to the upper arm of each of the levers 49, and also guided in the bracket 52, is an interponent member 54. Each interponent member 54 is adapted to cooperate with an individual cam 55 carried on the shaft 45. The apices of cam 55 are arranged helically, in well known manner, to effect sequential operation of the interponents 54. Each interponent 54 is also provided with a pair of marking and spacing abutments 56 and 57, respectively, adapted to cooperate under predetermined conditions with depending flanges or abutments 58 and 59 of a rocker member 17 mounted pivotally on a pivot shaft 62.

Rocker member 17 is provided with a vertically directed arm 63 terminating in a laterally directed portion 64 adapted to engage a notch 65 in the control bar 16, thereby establishing a pivotal articulation therewith. The cam projections or apices of cams 55, as previously mentioned, are arranged helically, in well known manner, so that upon rotation of said cams, the interponents 54 will be oscillated sequentially. Thus, if a code bar 35 has not been permitted to move rightwardly, FIG. 3 (because its ward 66 has been blocked by an operated selector lever 34, as described in said Patent No. 2,607,848), its associated interponent 54 will remain in the position shown in FIG. 3 with the abutment 56 in register with the flange 58 of the rocker member 17. Then, when the cams 55 are rotated, the interponent 54 associated with its respective cam, will, in predetermined timed relation, be actuated clockwise against the pull of its individual spring 60 so that the abutment 56 thereon will strike or abut the flange 58 (if the rocker member 17 was in its counterclockwise position) to rotate the rocker member 17 clockwise. As the rocker member 17 is thus rocked clockwise (as viewed in FIG. 3), its arm 63 will actuate the control bar 16 rightwardly to establish a spacing condition, the effect of which will presently appear.

On the other hand, if a code bar 35 has been permitted to move rightwardly, its associated interponent 54 will be actuated toward the left (FIG. 3) to bring the abutment 57 in register with the flange 59 of the rocker member 17. Therefore, when the cam 55 is rotated, the interponent 54 associated therewith will be actuated clockwise, as before, but now the abutment 57 will abut the flange 59 to rotate the rocker 17 counterclockwise. As the rocker 17 is thus rocked counterclockwise, its arm 63 will actuate the control bar 16 leftwardly to establish a marking condition to control the printer and perforator selector mechanisms, as will hereinafter appear. Associated with the series of cams 55 is a flutter cam (not shown) which cooperates with a locking bail (not shown) adapted to cooperate with the levers 49 as set forth in said Patent No. 2,607,848.

Figure 4:
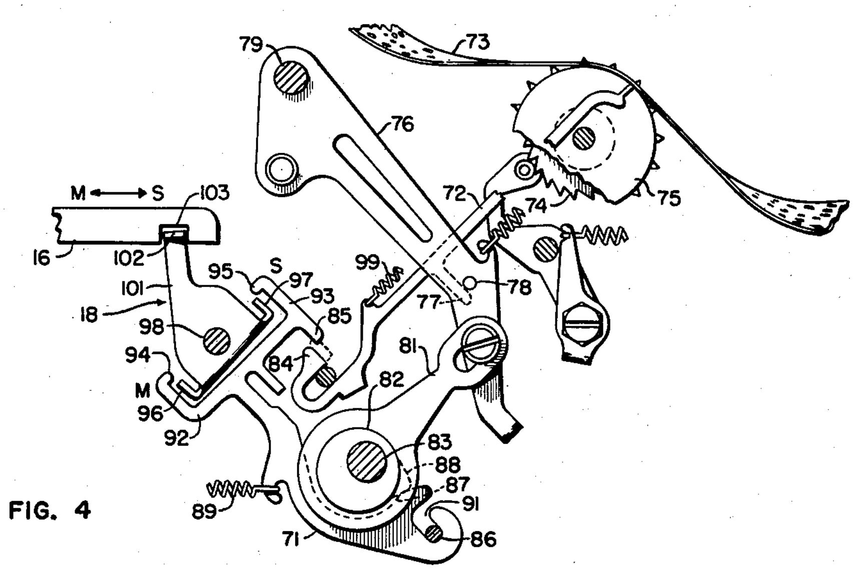
FIG. 4 is a fragmental view of the tape reading unit showing the interconnection between the rocker member thereof and the control bar.

Referring to FIG. 4, the structure shown therein is basically similar to that shown in United States Patent No. 2,781,415 issued February 12, 1957, to J. L. De Boo, except that the specifically conformed interponent members 71 are tape controlled instead of keylever controlled. The tape sensing or reading elements 72 are slidably mounted in appropriate manner to sense or read the perforations in the tape 73 which is stepped cyclically in well known manner by stepping ratchet 74 and a feed sprocket wheel 75 under the control of an operating bail member 76. Reading elements 72 are each provided with a laterally projecting arm 77 cooperable with a stud 78 fixed to the operating bail 76 which is mounted pivotally at 79. Oscillating movement is imparted to bail 76 through follower arm 81 operably related to an eccentric cam 82 carried on an operating shaft 83.

Each of the reading elements 72 is provided with a projection 84 adapted to cooperate in abuttal relation with a projection 85 on the interponent members 71. Interponents 71 are mounted on a common rod 86 appropriately located below the shaft 83, and are provided with individual cam follower portions 87 adapted to cooperate with their respective transmitting cams 88. Interponents 71 are normally biased upwardly and counterclockwise simultaneously by individual springs 89, said interponents 71 being slotted at 91 to permit vertically reciprocating movement thereof by cams 88. Interponents 71 are thus subjected to two kinds of motion; namely, oscillatory and reciprocatory. Cams 88 are helically arranged around shaft 83 to effect the reciprocation of interponents 71 sequentially, in a manner well known in the art.

Each of the interponents 71 is provided at its upper end with a pair of arms 92 and 93, having inwardly directed and confronting abutment portions 94 and 95, respectively, adapted to overhang a corresponding pair of abutments 96 and 97 of the transfer bail or rocker member 18 supported pivotally on a pivot rod 98. Rocker member 18 is provided with a vertically directed arm 101 terminating in a laterally directed portion 102 adapted to engage a notch 103 in the control bar 16, thereby establishing a pivotal articulation therewith. Thus, when the tape sensing or reading element 72 is actuated rightwardly and upwardly by its spring 99 (to the dotted line position in FIG. 4) in response to a marking condition, exemplified by a code perforation in the tape 73, its projection 84 will actuate its associated interponent 71 in a clockwise direction to present abutment 94 over the abutment 96 of the rocker member 18. Then, when the interponent 71 is depressed by its cam 88, the rocker 18 will be rotated to its counterclockwise position. As the rocker member 18 is thus rotated counterclockwise, its arm 101 will actuate the control bar 16 leftwardly to establish a marking condition to control the printer and perforator selector mechanisms, as will presently appear. On the other hand, if the tape sensing element 72 is prevented from moving rightwardly and upwardly due to the absence of a perforation in the tape, which is indicative of a spacing condition, the projection 84 will assume the solid line position shown in FIG. 4, thus permitting spring 89 to rotate interponent 71 counterclockwise to present abutment 95 thereof over the abutment 97 of the rocker member 18. Then, when the interponent 71 is depressed by its cam 88, the rocker member 18 will be rotated to its clockwise position. As the rocker member 18 is thus rotated clockwise, its arm 101 will actuate the control bar 16 rightwardly to establish a spacing condition to control the printer and perforator selector mechanisms, as will hereinafter appear.

Figures 5, 6:
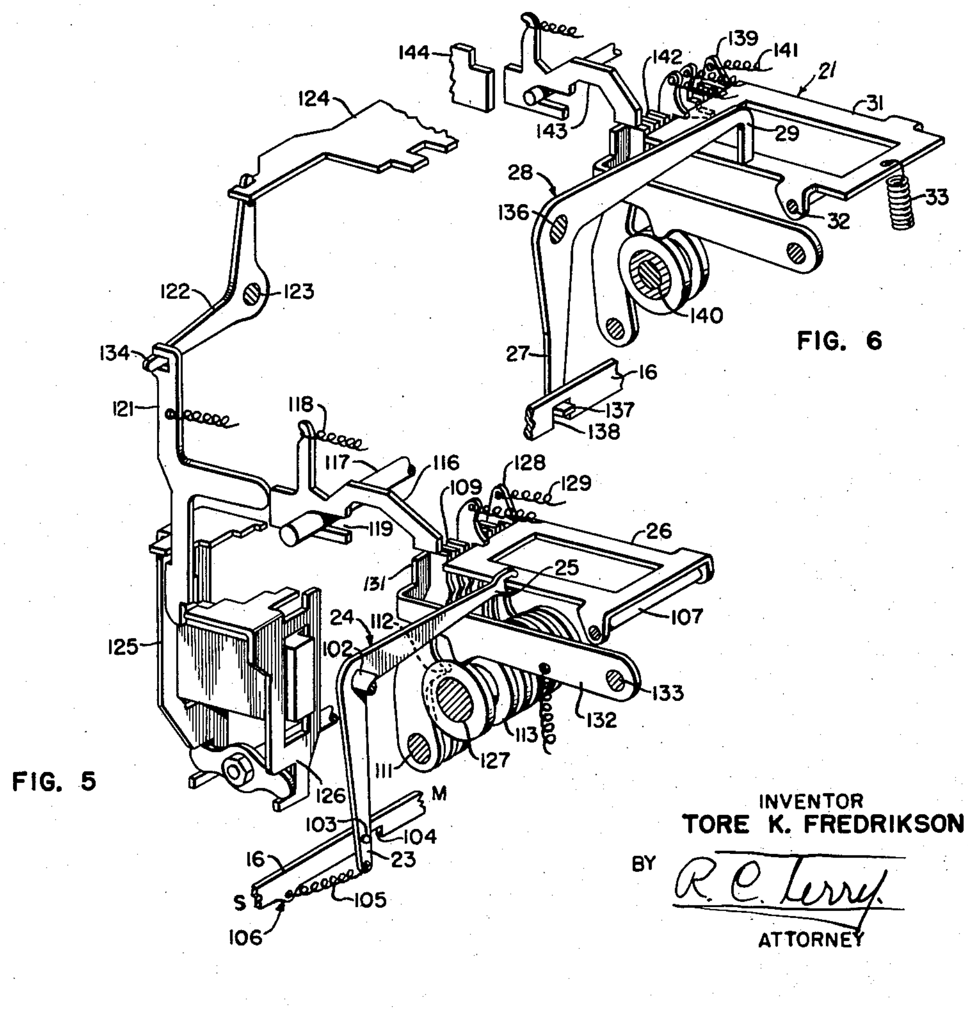
FIG. 5 is a perspective view showing the interconnection between the receiver selector mechanism and the control bar.
FIG. 6 is a perspective view showing the interconnection between the selector mechanism of the perforating unit and the control bar.
Figure 8:
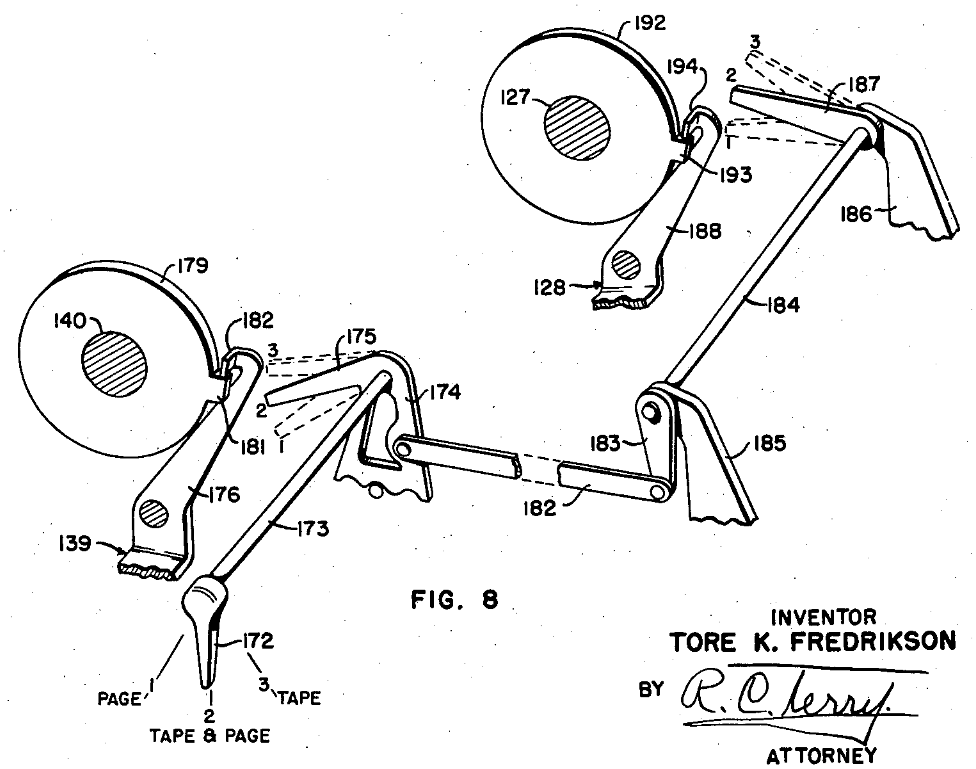
FIG. 8 is a schematic perspective view of a manual control switch for printer and/or perforator operation.

Having reference now to FIG. 5, the structure illustrated therein is basically similar to that shown in FIG. 8 of United States Patent No. 2,505,729, issued April 25, 1950, to W. J. Zenner, except that the selector magnet has been dispensed with, as previously mentioned, retaining only the pivot plate or selecting element 26 (analogous to the armature pivot plate 17 of said Patent No. 2,505,729). As previously described, the control bar 16 has a marking and a spacing condition imparted to it by either the keyboard apparatus shown in FIG. 3, or the tape controlled device shown in FIG. 4. In FIG. 5, the control bar 16 is moved rightwardly to establish a marking condition and leftwardly to establish a spacing condition. This movement of control bar 16 is imparted through the bell crank lever 24 to the pivot plate or selecting element 26.

The bell crank lever 24 is mounted pivotally at 102 and is interconnected with the control bar 16 and element 26 in any suitable manner. For example, the depending arm 23 is provided with a stud 103 adapted to cooperate with a notch 104 in the bar 16 in such a manner as to provide a yielding connection wherein one end of a spring 105 is connected to the extremity of arm 23 and the other end is anchored to a projection 106 on bar 16. Thus, stud 103 is normally spring-held against one side of notch 104 whereby the selective movement of bar 16 is imparted to lever 24. The horizontal arm 25 of lever 24 is also suitably articulated pivotally to the element 26 which is appropriately mounted pivotally on a shaft 107.

Simulating the oscillations imparted to the selecting element 26 by a selector magnet, in well known manner, as described in said Patent No. 2,505,729, the control bar 16, through bell crank lever 24, will oscillate the selecting element or pivot plate 26 to effect marking and spacing conditions. For example, the bar 16 is normally held in its rightward position as viewed in FIG. 5 (leftward as viewed in FIG. 2) thus simulating a normal marking condition, which condition is transferred through the bell crank lever 24 to the selecting element or pivot plate 26 to hold the element 26 in its clockwise position (relative to pivot shaft 107). This latter position of element 26 is the position the selector armature pivot plate 17 of said Patent No. 2,505,729 would assume when pulled up or attracted by its selector magnet due to a marking condition of a signal line.

As is known in the selector art, the selecting element 26 cooperates with a plurality of selector levers 109 (five in the present embodiment) mounted pivotally on a shaft 111. Each lever 109 is provided with a cam follower portion 112 which cooperates with a selector cam 113 individual thereto, said levers 109 being normally biased toward said cams 113 by individual springs (not shown). Cams 113 are fixed to a shaft 127 to which rotation is imparted by means of a motor (not shown). The upper extremity of each lever 109 cooperates with the edge of the pivot plate or selecting element 26.

Associated with each lever 109 and operably disposed thereabove is an interponent 116 pivotally mounted on a pivot shaft 117. Interponents 116 are normally biased in a clockwise direction (as viewed in FIG. 5) by their individual springs 118 so that the extremity of each interponent 116 normally rests upon the upper end of its associated lever 109. The interponents 116 are each provided with an open-ended slot 119 in order that the interponents 116 are slidably on the pivot shaft 117.

Cooperatively related to interponents 116 are a corresponding series of substantially T-shaped members 121 which are pivotally articulated to individual ones of a series of bell crank levers 122 pivotally mounted at 123, which bell cranks 122 are in turn pivotally articulated to code bars 124 individual thereto. The lower end of each member 121 is conformed to cooperate with a pair of reciprocably operating bail members 125 and 126 in a manner described in said Patent No. 2,505,729 to selectively rock the associated bell crank levers 122 to selectively position the code bars 124 under the control of the interponents 116.

In operation, the selector cam assembly carried on shaft 127 is rotated at a speed substantially equivalent to the speed at which the shafts 45 and 83 of the keyboard device 12 and tape reader 14, respectively, are rotated. In accordance with well known practice, the normal stop condition is marking, hence the control bar 16 assumes its rightward position (viewed in FIG. 5) and the selecting element 26 assumes its marking or clockwise position to present its edge into the path of a U-shaped clutch trip lever 128. In response to a start condition, which is of spacing nature, wherein the control bar 16 is moved to its leftward position (FIG. 5), the selecting element 26 is moved (through bell crank 24) to its counterclockwise or spacing position to permit spring 129 to rotate the lever 128 clockwise to release the clutch, exemplified by stop disc 192 (FIG. 8), to initiate rotation of the selector shaft 127, as set forth in said Patent No. 2,505,729.

As the selector cams 113 rotate, the depression in the first cam 113 is presented to the cam follower 112 during the first signal interval of the code combination. If the signal interval represents a marking condition, the selecting element 26 will assume its clockwise position and the first lever 109 will be free to respond to the pull of its spring (not shown). Lever 109 will then be withdrawn from beneath the end of slide or interponent 116, which under the influence of its spring 118 will rotate slightly to rest upon the flange 131 of reset bail 132 pivotally mounted at 133. As the selector cam 113 continues to rotate, the high portion thereof will coact with the cam projection 112 to rotate lever 109 in a counterclockwise direction, whereupon the slide or interponent 116 will be urged leftwardly to cause T-member 121 to rotate slightly about pivotal interconnection 134 to bring the outer shoulder of member 121 in cooperation with bail 125 which on its downward movement will draw member 121 downwardly to in turn impart counterclockwise rotation to bell crank 122 to cause the associated code bar 124 to be shifted leftwardly to its marking position as described in greater detail in said Patent No. 2,505,729.

If the first significant or intelligence signal interval (after the start interval) had been of spacing nature, the control bar 16 would have assumed its leftward or spacing position (FIG. 5) and the bell crank 24 would have been rotated clockwise to impart counterclockwise rotation to the selecting element 26, and the lever 109 would be blocked against clockwise movement, whereupon the extremity of interponent 116 will continue to ride on top of lever 109 and no leftward slidable movement of interponent 116 will occur. T-member 121 will remain in the position shown in FIG. 5, so that the inner shoulder thereof will be presented in the path of the bail 126 to cause upward movement of member 121 to, in turn, rotate bell crank 122 clockwise to impart rightward movement to code bar 124 to its spacing position.

Referring now to FIG. 6, the structure shown therein is basically similar to that shown in FIG. 1 of United States Patent No. 2,648,385, issued August 11, 1953, to J. L. De Boo, except that the selector magnet has been dispensed with, as previously described, retaining only the pivot plate or selecting element 31 (analogous to the selector armature 28 of said Patent No. 2,648,385). The control bar 16 has a marking and spacing position or condition imparted to it by one or the other of the rockers 17 or 18, as previously mentioned. In FIG. 6. the control bar 16 is moved rightwardly to establish a marking condition and leftwardly to establish a spacing condition. This movement of control bar 16 is imparted through the bell crank lever 28 to the pivot plate or selecting element 31.

The bell crank 28 is mounted pivotally at 136 and is interconnected with control bar 16 in any suitable manner. For example, in the embodiment shown, the depending arm 27 of lever 28 terminates in a laterally directed portion 137 engaging notch 138 in said control bar 16. The other arm has abuttal relation with the selecting element 31 due to the action of spring 33. Thus, when bar 16 assumes its rightward or marking position, the selecting element 31 is biased clockwise to its marking position by spring 33. On the other hand, when bar 16 assumes its leftward or spacing position (FIG. 6) the selecting plate 31 is depressed to its counterclockwise or spacing position against the action of spring 33.

Comparable to the structure shown in FIG. 5, a U-shaped clutch trip lever 139 cooperates with the selecting element 31 in well known manner, so that in response to a start condition, which is of spacing nature, wherein the control bar 16 is moved to its leftward position (FIG. 6) the selecting element 31 is moved (through bell crank 28) to its counterclockwise or spacing position, to allow the spring 141 to rotate lever 139 clockwise to release the clutch, exemplified by stop disc 179 (FIG. 8), to initiate the rotation of the selector cam assembly carried on shaft 140 to thereby effect the operation of the selector mechanism, as previously described, in connection with FIG. 5. Thus, when the selector lever 142 is operated in response to a marking condition, an intermediate slide 143 is actuated (leftwardly in FIG. 6) to impart like movement to a punch interponent 144, as described in said Patent No. 2,648,385

From the foregoing description, it is observed that the present invention provides an all-mechanical send-receive set, wherein all the direct current electrical components of the conventional telegraph apparatus have been dispensed with, and wholly mechanical interconnections are provided between the keyboard device and tape reader, and the printer and perforator devices. Moreover, no electrical signals are utilized, the control being effected entirely mechanically to establish marking and spacing conditions to control selecting operation.

Figure 7:
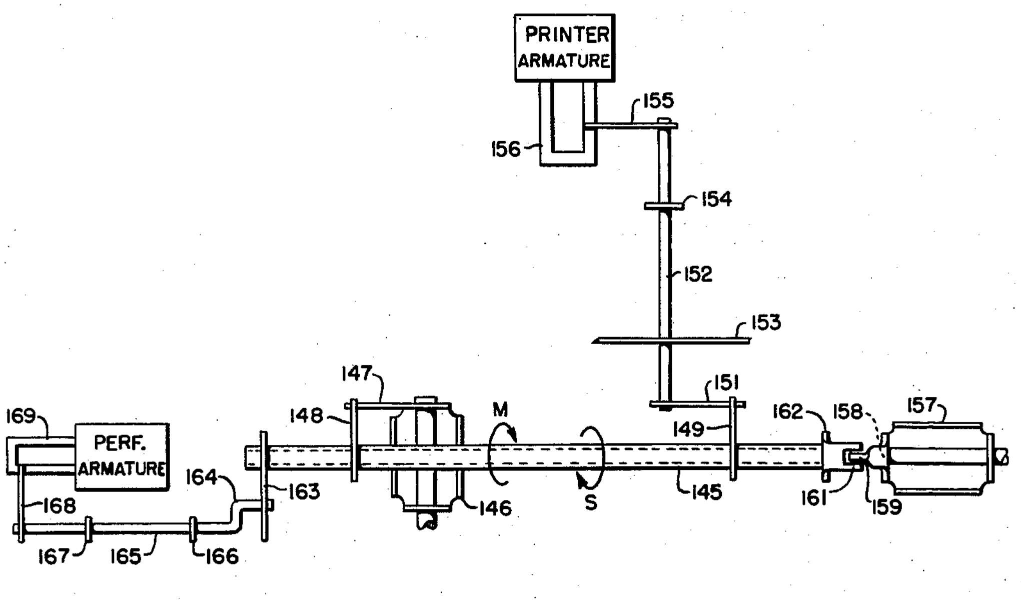
FIG. 7 is a view showing an alternate form of control bar.

An alternate form of control bar is illustrated in FIG. 7, wherein a control bar having a rocking motion is contemplated instead of the reciprocating control bar 16. The control bar 145, of course, may be of any conformation in cross section, and suitably supported rockably in the apparatus. In the keyboard device, the rocker member 146 (comparable to rocker 17) has an arm 147 fixed thereto which cooperates with an arm 148 fixed to the control rod 145, so that as the rocker 146 is oscillated to its marking and spacing positions, in the manner described in connection with rocker 17, this rocking motion is imparted to rod 145. Connected to rod 145 is an arm 149 which cooperates with the laterally directed end 151 of a rod 152 suitably carried rockably in brackets 153 and 154 the other end 155 of which is laterally directed in the opposite direction to cooperate with the pivot plate or selecting element 156 of the page printer selecting mechanism (comparable to selecting element 26). Thus, as the rocker 146 is oscillated in response to the operation of the keyboard, as previously described, the marking and spacing conditions are transferred through rods 145 and 152 to the selecting plate 156 to control the printer selector in the manner described hereinbefore.

In a manner similar to that described in FIGS. 2 and 4, the rocker member 157 (comparable to rocker 18) of a tape reader (similar to that shown in FIG. 4) is provided with a vertical arm 158 (comparable to arm 101) which terminates in a lateral portion 159 which is articulated to the laterally directed end 161 of an arm 162 fixed to the rod 145 so that the oscillations of the rocker member 157 of the tape reader are transferred through the rods 145 and 152 to the selecting element 156 of the page printer as previously described in connection with FIG. 5. Moreover, the control rod 145 is further provided with an arm 163 articulated to the laterally directed end 164 of a rod 165 suitably mounted rockably in brackets 166 and 167, which rod 165 terminates at its other end in a laterally directed portion 168 adapted to cooperate with the selecting element 169, comparable to the selecting element 31 of the perforator shown in FIG. 6.

In the event it is desired to control the simultaneous operation of the printer 13 and perforator 15, as well as the separate operations thereof, a manual control switch arrangement illustrated in FIG. 8 may be employed.

Referring to FIG. 8, switch 171 (shown in FIG. 1) comprises a manually-operable pointer 172 fixed to a shaft 173 to which is also fixed a blocking plate 174 having a blocking arm 175 adapted to be moved into and out of blocking relation with the arm 176 of the start-stop lever 139 of the reperforator unit 15. Connected pivotally to the blocking plate 174 is one end of a link 182, the other end of which is pivotally connected to an arm 183 fixed to a shaft 184 suitably journalled in brackets 185 and 186. Fixed to the opposite end of shaft 184 adjacent to bracket 186 is a blocking arm 187 adapted to be moved into and out of blocking relation with the arm 188 of the start-stop lever 128 of the printer unit 13.

When the pointer 172 is directed downwardly, as indicated in FIG. 8, the arms 175 and 187 are both in their non-blocking positions 2, thus permitting simultaneous operation of the units 13 and 15. When the pointer 172 is in the "page" position 3, the arm 175 is in the position to block the lever arm 176 and thereby prevent operation of the reperforator unit 15, and the arm 187 is in its extreme clockwise (non-blocking) position to permit operation of the printer unit 13. Then, when the pointer 172 is in the "tape" position 1, the arm 175 is in its extreme counterclockwise position (non-blocking) to permit operation of the reperforator unit 15, and the arm 187 is in its blocking position, to prevent the operation of the printer unit 13.

It is contemplated that changes and modifications may be made in the invention without departing from the scope thereof.

What is claimed is:

1. In a permutation code controlled mechanical recorder, the combination of a selectively operable signal condition originating device including instrumentalities permutatively settable mechanically to positions representative of intelligence data, a receiving selector mechanism including instrumentalities settable to record said intelligence data, and solely mechanical means interconnecting said originating device and said selector mechanism and operable under control of said originating device to cause said selector to set the instrumentalities in the receiving selector mechanism in accordance with the positions in which the instrumentalities in the signal condition originating device are set.

2. In a permutaton code controlled mechanical recorder, the combination of a permutation code signal originating device including sequentially operated instrumentalities permutatively movable mechanically to positions representative of intelligence data, rocker means controlled by said instrumentalities, permutation code receiving means including instrumentalities settable to control the recording of said data, and solely mechanical means interconnecting said originating device with said receiving means and operable under control of said originating device for controlling the setting of the instrumentalities in said receiving means.

3. In a permutation code controlled mechanical recorder the combination of a permutation code signal originating device including sequentially operated instrumentalities permutatively movable mechanically to positions representative of intelligence data, rocker means controlled by said instrumentalities, a receiving selector mechanism comprising an oscillatable selector element and instrumentalities settable by said element to control the recording of said data, and mechanical linkage interconnecting said rocker means and said oscillatable selector element for actuating said selector element.

4. In a permutation code controlled mechanical recorder a keyboard device comprising a series of key actuated code bars, a plurality of interponents, one associated with each of said code bars and movable by its associated code bar to either of two selected positions, each of said interponents having a pair of abutments extending from it and spaced one from another, a rockable member having a pair of abutments extending from it with which the abutments on the interponents may be alternately associated when the interponents are moved to their selected positions, a distributor cam assembly disposed subjacent to said rockable member for actuating said interponents sequentially thereby to cause said interponents to rock said rockable member to one or the other of two positions as determined by the position to which the abutments on said interponents have been moved, a receiving selector mechanism comprising a cyclically operable cam, means for actuating selected recording instrumentalities, oscillatable means for controlling said receiving selector mechanism to select said recording instrumentalities for actuation, and solely mechanical linkage between said rockable member and said oscillatable means for transferring the code conditions set up by the keyboard device to the receiving selector mechanism.

5. In a signal controlled recording device, a plurality of character elements individually selectable for producing a visual impression thereof, a first set of permutationally positionable selector elements for selecting said character elements, a first single control member having two control positions for controlling the permutational positioning of said first set of selector elements, a second set of permutationally positionable selector elements, means for positioning said second set of selector elements according to the selective attributes of signals representing said character elements, a second single control element having two control positions, means for positioning said second single control element according to the permutational position of each of the selector elements of said second set of selector elements in succession, and a mechanical linkage interconnecting said second and said first single control members for causing the second control member to position the first control member.

6. Apparatus according to claim 5 having a plurality of manually operable keylevers for permutationally positioning the selector elements of said second set.

7. Apparatus according to claim 5 having a set of sensing members for sensing a perforated record medium and for positioning said second set of selector elements according to the selective attributes of signals contained in said record medium.

8. Apparatus according to claim 5 having means for positioning said second set of selector elements according to and under the control of signal indicia on a record medium.

9. In combination, a signal condition originating device including a plurality of code elements, a receiving selector mechanism including a plurality of selector elements, a first single member positionable in either of two positions, distributor means for positioning said member according to the condition of each of said code elements in succession, a second single member, a mechanical linkage interconnecting said members for causing the first member to position the second member correspondingly, and distributor means for successively positioning said selector elements according to the positions of said second member.

References Cited in the file of this patent

UNITED STATES PATENTS 2,174,731 Dirkes et al. ............ Oct. 3, 1939